United States Patent
Layne et al.

(10) Patent No.: US 9,475,355 B2
(45) Date of Patent: Oct. 25, 2016

(54) TAG AXLE SUSPENSION SYSTEM WITH TIRE AT LOWEST POINT WHEN LIFTED

(71) Applicant: WATSON & CHALIN MANUFACTURING, INC., McKinney, TX (US)

(72) Inventors: Jeffrey Layne, Rowlett, TX (US); Damon Delorenzis, Naperville, IL (US); Christopher Mlinarich, Richardson, TX (US)

(73) Assignee: WATSON & CHALIN MANUFACTURING, INC., McKinney, TX (US)

( * ) Notice: Subject to any disclaimer, the term of this patent is extended or adjusted under 35 U.S.C. 154(b) by 0 days.

(21) Appl. No.: 14/817,396

(22) Filed: Aug. 4, 2015

(65) Prior Publication Data
US 2016/0046163 A1 Feb. 18, 2016

(30) Foreign Application Priority Data
Aug. 12, 2014 (WO) .................. PCT/US14/50627

(51) Int. Cl.
*B60G 9/02* (2006.01)
(52) U.S. Cl.
CPC ........... *B60G 9/022* (2013.01); *B60G 2204/47* (2013.01); *B60G 2204/4702* (2013.01); *B60G 2300/02* (2013.01); *B60G 2300/402* (2013.01); *B60G 2400/60* (2013.01)

(58) Field of Classification Search
CPC .................... B60G 2300/402; B60G 2204/47; B60G 2204/4702
USPC ........................................................ 280/86.5
See application file for complete search history.

(56) References Cited

U.S. PATENT DOCUMENTS

| | | | | |
|---|---|---|---|---|
| 3,912,293 A | * | 10/1975 | Harbers | B60G 17/052 180/24.02 |
| 3,966,223 A | * | 6/1976 | Carr | B60G 7/04 188/DIG. 1 |
| 4,119,170 A | * | 10/1978 | Hutcherson | B60G 17/033 180/448 |
| 4,165,884 A | * | 8/1979 | Allison | B62D 61/125 180/24.02 |
| 4,256,326 A | | 3/1981 | Cantrell et al. | |
| 4,762,421 A | * | 8/1988 | Christenson | B60G 11/14 180/209 |
| 4,783,096 A | * | 11/1988 | Ramsey | B62D 61/12 280/124.106 |

(Continued)

OTHER PUBLICATIONS

International Search Report with Written Opinion issued Apr. 27, 2015 for PCT Patent Application No. PCT/US2014/050627, 10 pages.

(Continued)

*Primary Examiner* — Ruth Ilan
(74) *Attorney, Agent, or Firm* — Smith IP Services, P.C.

(57) ABSTRACT

A tag axle suspension system can include a tire and at least one hanger bracket pivotable relative to a vehicle frame to deployed and lifted configurations. In the lifted configuration, the tire can be a lowest component of the suspension system, and can be a first component to engage a road surface. A tag axle suspension system can include an air spring and a travel limit device that limits compression of the air spring in a lifted configuration of a hanger bracket. A tag axle suspension system can include an axle, a suspension arm pivotably connected between a hanger bracket and the axle, and a travel limit device that limits displacement of the suspension arm in a lifted configuration of the hanger bracket. The travel limit device can limit displacement of the axle toward an air spring support in the lifted configuration of the hanger bracket.

23 Claims, 4 Drawing Sheets

(56) References Cited

U.S. PATENT DOCUMENTS

| | | | |
|---|---|---|---|
| 5,090,495 A * | 2/1992 | Christenson | B60G 5/04 180/209 |
| 5,192,101 A * | 3/1993 | Richardson | B60G 11/26 180/209 |
| 5,540,454 A * | 7/1996 | VanDenberg | B62D 61/12 180/209 |
| 5,549,322 A * | 8/1996 | Hauri | B62D 61/12 180/209 |
| 5,588,665 A * | 12/1996 | Pierce | B60G 9/02 180/209 |
| 5,597,174 A * | 1/1997 | Christenson | B60G 5/04 180/209 |
| 6,073,946 A | 6/2000 | Richardson | |
| 6,116,698 A | 9/2000 | Smith et al. | |
| 6,158,750 A | 12/2000 | Gideon et al. | |
| 6,669,303 B2 | 12/2003 | Dodd | |
| 6,899,348 B2 | 5/2005 | Dodd | |
| 7,527,118 B2 * | 5/2009 | Bushinski | B62D 55/02 180/209 |
| 2003/0107198 A1 | 6/2003 | VanDenberg | |
| 2004/0178594 A1 | 9/2004 | Keeler et al. | |

OTHER PUBLICATIONS

Silent Drive Inc.; "Maxle DB Hydraulic Raise & Lower Air Ride Suspension", Model Maxle DB brochure, dated Nov. 27, 2005, 1 page.

* cited by examiner

TAG AXLE SUSPENSION SYSTEM WITH TIRE AT LOWEST POINT WHEN LIFTED

CROSS-REFERENCE TO RELATED APPLICATION

The present application claims the benefit under 35 USC §119 of the filing date of International Application No. PCT/US14/50627, filed 12 Aug. 2014. The entire disclosure of this prior application is incorporated herein by this reference.

BACKGROUND

This disclosure relates generally to vehicle suspension systems and, in one example described below, more particularly provides a tag axle suspension system, in which a tire is a lowest component of the suspension system when it is lifted.

A tag axle suspension system refers to a type of vehicle suspension system that includes a liftable axle positioned behind a vehicle. The tag axle suspension system can increase a vehicle's maximum gross weight for compliance with bridge laws.

Unfortunately, since the tag axle suspension system is positioned behind the vehicle, when the vehicle is traversing substantial dips, or backing up toward or from an incline, rigid components of some tag axle suspension systems can come into contact with road surfaces.

Therefore, it will be appreciated that improvements are continually needed in the art of constructing tag axle suspension systems.

DETAILED DESCRIPTION

Figure 1:
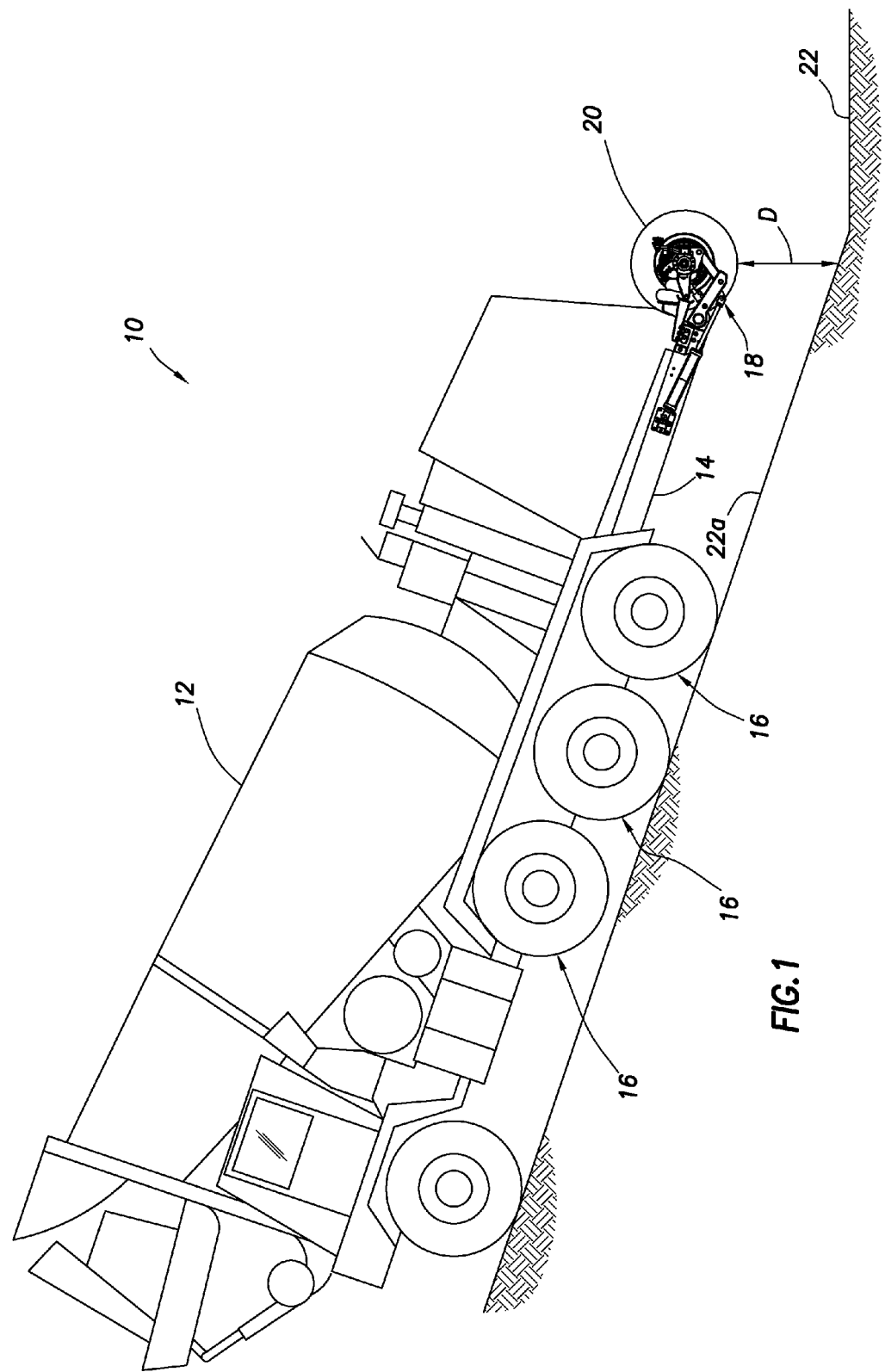
FIG. 1 is a representative partially cross-sectional view of an example of a vehicle which can embody principles of this disclosure.

Representatively illustrated in FIG. 1 is a vehicle 10 which can embody principles of this disclosure. However, it should be clearly understood that the vehicle 10 is merely one example of an application of the principles of this disclosure in practice, and a wide variety of other examples are possible. Therefore, the scope of this disclosure is not limited at all to the details of the vehicle 10 described herein and/or depicted in the drawings.

The vehicle 10 of FIG. 1 is of the type known to those skilled in the art as a forward discharge concrete mixer truck. Thus, the vehicle 10 includes a concrete mixer 12 supported on a frame 14 of the vehicle. However, it should be clearly understood that the scope of this disclosure is not limited to use with front discharge concrete mixer trucks, or to use with concrete mixer trucks at all.

In the FIG. 1 example, the vehicle 10 includes several suspension systems 16 positioned under the vehicle frame 14, at least one of which is liftable relative to the frame. Other or none of the suspension systems 16 may be liftable in other examples.

In addition, a tag axle suspension system 18 is positioned at a rear end of the frame 14. As viewed in FIG. 1, the tag axle suspension system 18 is in a lifted configuration, with tires 20 of the suspension system lifted out of engagement with a road surface 22. Only one of the tires 20 is depicted in FIG. 1, so that various components of the suspension system 18 can be seen.

Note that, in the lifted configuration of the tag axle suspension system 18, the tires 20 are a vertically lowermost component of the suspension system. A vertical distance D from the road surface 22 to the tires 20 is less than a vertical distance to any of the other components of the suspension system 18.

In this manner, if the tag axle suspension system 18 should come in contact with the road surface 22 (for example, due to the vehicle 10 traversing a substantial dip or backing up toward or from a substantial inclined section of road surface 22a), the tires 20 will be the first components of the suspension system to contact the road surface (whether the road surface that is contacted is generally horizontal or inclined). This can prevent any significant damage to the road surface 22 or to the suspension system 18.

Figure 2:
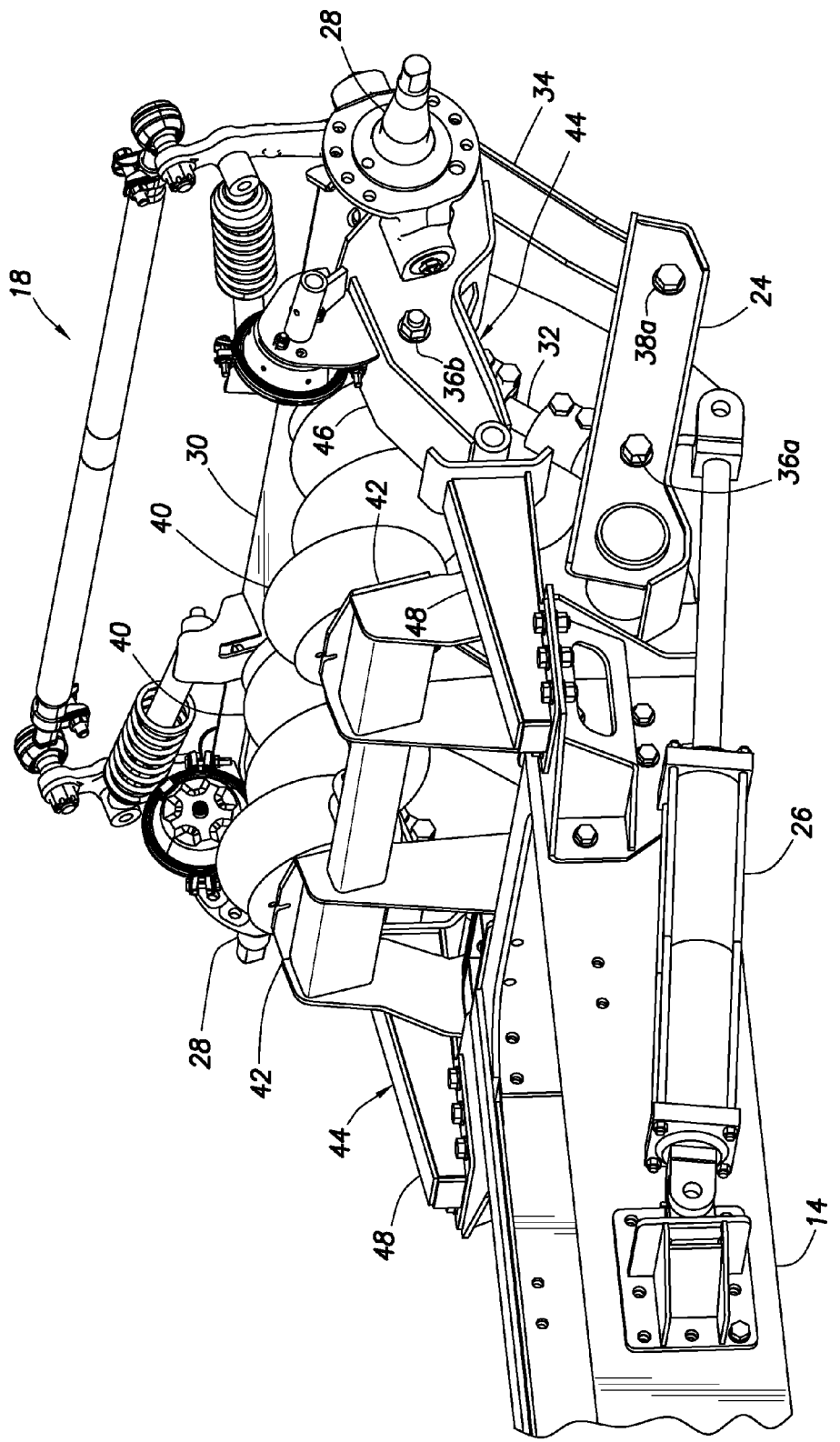
FIG. 2 is a representative perspective view of a tag axle suspension system that can be used with the vehicle of FIG. 1, and which can embody the principles of this disclosure.

Referring additionally now to FIG. 2, a perspective view of the tag axle suspension system 18 is representatively illustrated. The frame 14 of the vehicle 10 of FIG. 1 is also depicted in FIG. 2, but it should be clearly understood that the tag axle suspension system 18 may be used with other vehicles and other frames, in keeping with the principles of this disclosure.

In the FIG. 2 example, hanger brackets 24 (only one of which is visible in FIG. 2) are pivotably attached to the vehicle frame 14. The hanger brackets 24 are pivoted to deployed and lifted configurations by an actuator 26 (such as, a hydraulic, pneumatic or electrical actuator).

In the deployed configuration, the tires 20 (not shown in FIG. 2) are in contact with a road surface, and the tag axle suspension system 18 (along with the other suspension systems 16 of the vehicle 10) suspends the vehicle frame 14 above the road surface. In the lifted configuration, the tires 20 are raised out of contact with the road surface (as depicted in FIG. 1).

The tag axle suspension system 18 of FIG. 2 is steerable, with spindles 28 being pivotably mounted at opposite ends of an axle 30. Hubs, wheels and tires are mounted to the spindles 28 in actual practice.

The axle 30 is connected to the hanger brackets 24 by means of suspension beams or arms 32, 34. The upper suspension arm 32 is pivotably connected to the hanger bracket 24 and axle 30 at pivots 36a,b and the lower suspension arm 34 is pivotably connected to the hanger bracket and axle at pivots 38a,b (pivot 38b is not visible in FIG. 2, see FIGS. 3 & 4).

In this example, the suspension system 18 is of the type known to those skilled in the art as a parallelogram suspension, since the pivots 36a,b and 38a,b are at corners of a parallelogram, and the suspension arms 32, 34 remain parallel to each other during compliance of the suspension system. However, in other examples a modified parallelogram suspension or another type of suspension geometry may be used.

In some examples, multiple suspension arms may not be used, the suspension arm(s) may not be pivotably connected to the axle 30 (e.g., as in a spring beam suspension), and/or other differences may exist. Thus, the scope of this disclosure is not limited to any of the details of the suspension system 18 described herein or depicted in the drawings.

In the FIG. 2 example, air springs 40 are used to assist in resiliently suspending the vehicle frame 14. When the suspension system 18 is in its deployed configuration, the air springs 40 are internally pressurized and thereby apply a compressive biasing force between the axle 30 and air spring supports 42.

The air spring supports 42 are pivotably mounted to the vehicle frame 14, so that they rotate with the hanger brackets 24 relative to the frame. In the deployed configuration (depicted in FIG. 3), the air springs 40 are positioned generally vertically between the axle 30 and the air spring supports 42, so that the resilient compressive force generated by the air springs can assist in vertically suspending the vehicle frame 14 over the road surface.

The suspension system 18 also includes travel limit devices 44. The travel limit devices 44 serve to maintain the suspension system 18 in an extended state (that is, without substantially compressing the air springs 40 between the axle 30 and the air spring supports 42, without the suspension arms 32, 34 being pivoted substantially forward relative to the hanger brackets 24, etc.). In this manner, the tires 20 will remain the vertically lowest components of the suspension system 18 when it is in the lifted configuration (see FIG. 1).

In the FIG. 2 example, each travel limit device 44 includes a structure 46 attached to the axle 30 and another structure 48 attached to the vehicle frame 14. The structures 46, 48 may be attached by welding, fastening, integral forming, or by any other suitable technique.

As depicted in FIG. 2, the structures 46, 48 are in contact with each other when the suspension system 18 is in its lifted configuration. Thus, the axle 30 is prevented from pivoting forward, which would otherwise raise the tires 20, so that the tires would not be the lowest components of the suspension system 18.

Figure 3:
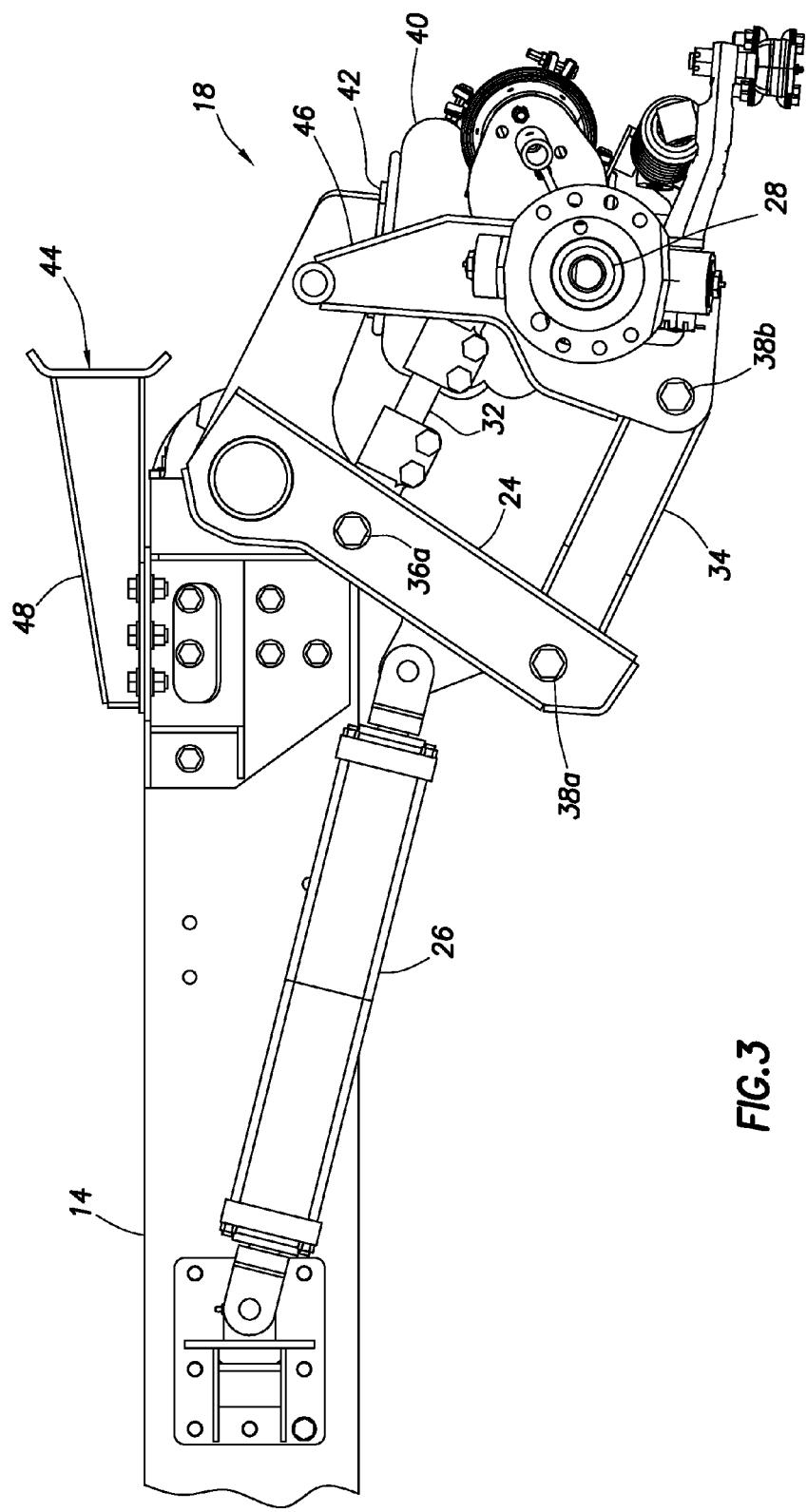
FIG. 3 is a representative side elevational view of the tag axle suspension system in a deployed configuration.

Referring additionally now to FIG. 3, a side view of the suspension system 18 is representatively illustrated in the deployed configuration. In this configuration, the actuator 26 has pivoted the hanger bracket 24 and air spring supports 42 downward, so that the air springs 40 are now generally vertically between the axle 30 and the air spring supports.

The air springs 40 are internally pressurized and the tires 20 contact the road surface 22 (not visible in FIG. 3, see FIG. 1). The suspension system 18 is now effective to assist in suspending the frame 14 above the road surface 22.

Note that, in this deployed configuration, the structures 46, 48 of the travel limit device 44 do not contact each other. Thus, the axle 30 (not visible in FIG. 3, see FIG. 2) can displace upward to compress the air springs 40 as needed for compliance of the suspension system 18, for example, when traversing uneven road surfaces, etc.

Figure 4:
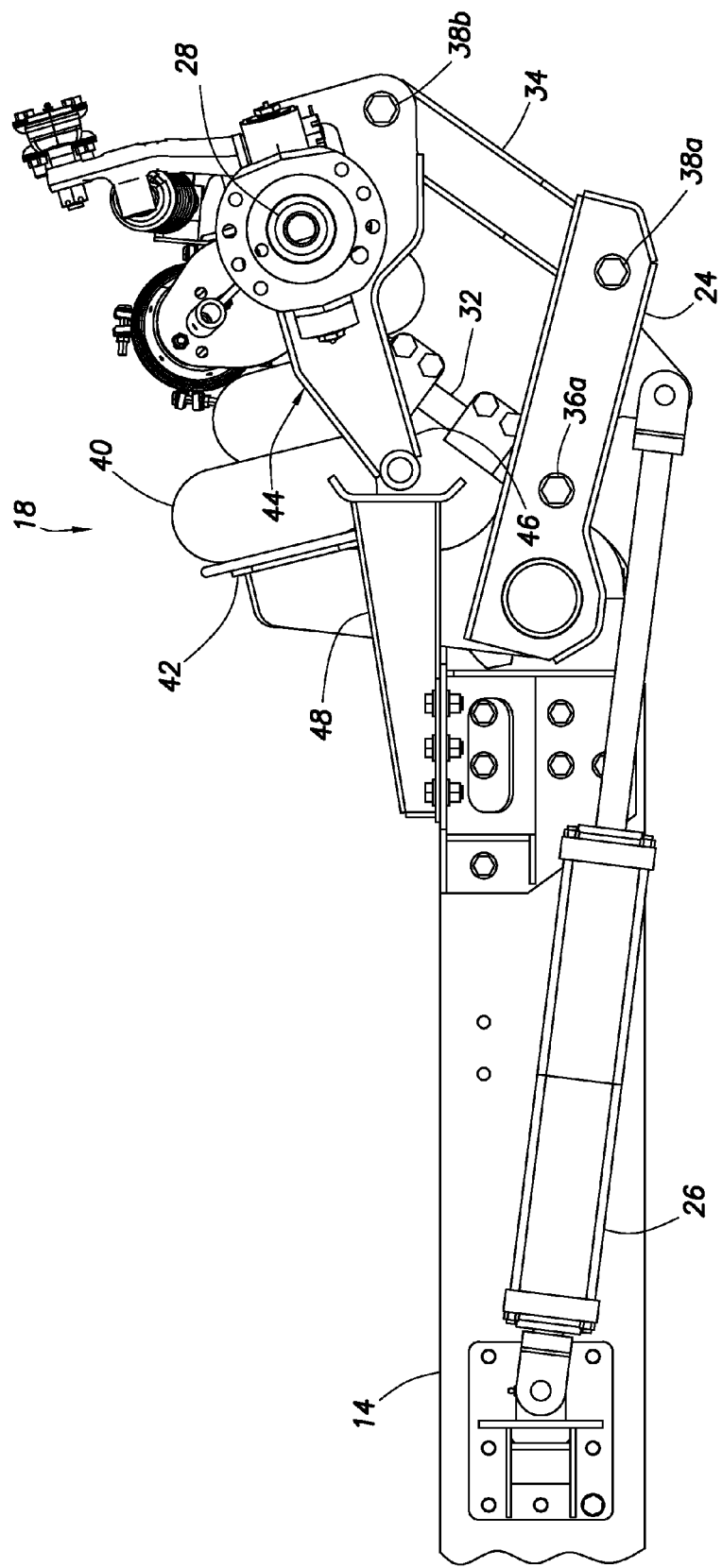
FIG. 4 is a representative side elevational view of the tag axle suspension system in a lifted configuration.

Referring additionally now to FIG. 4, a side view of the suspension system 18 is representatively illustrated in the lifted configuration. In this configuration, the actuator 26 has pivoted the hanger bracket 24 and air spring supports 42 upward, so that the air springs 40 are now generally horizontally between the axle 30 and the air spring supports.

The tires 20 are raised out of contact with the road surface 22 (not visible in FIG. 4, see FIG. 1) and the air springs 40 are not necessarily internally pressurized. The suspension system 18 would typically be in this configuration when it is not needed to assist in suspending the frame 14 above the road surface (such as, when the vehicle 10 is not fully loaded).

Note that, in this lifted configuration, the structures 46, 48 of the travel limit device 44 can contact each other. Thus, the axle 30 (not visible in FIG. 4, see FIG. 2) cannot displace substantially forward to compress the air springs 40. Thus, the tires 20 remain the lowest components of the suspension system 18 in this lifted configuration.

It may now be fully appreciated that the above disclosure provides significant advancements to the art of constructing tag axle suspension systems. In examples described above, tires 20 of a tag axle suspension system 18 can remain the lowest components of the suspension system, even when the suspension system is in its lifted configuration.

More specifically, the above disclosure provides to the art a tag axle suspension system 18 that, in one example, comprises a tire 20, and a hanger bracket 24 pivotable relative to a vehicle frame 14 to deployed and lifted configurations. In the lifted configuration, the tire 20 comprises a first component of the suspension system 18 engageable with a road surface 22. The tire 20 can comprise a lowest component of the suspension system 18.

The tag axle suspension system 18 can include an air spring 40 which, in the deployed configuration, suspends an air spring support 42 pivotably attached to the vehicle frame 14 above an axle 30 of the suspension system, and at least one travel limit device 44 which, in the lifted configuration, limits displacement of the axle 30 toward the air spring support 42.

The travel limit device 44 may comprise a first structure 46 attached to the axle 30, and a second structure 48 that attaches to the vehicle frame 14. The first structure 46 may pivot toward the second structure 48 in response to displacement of the hanger bracket 24 from the deployed configuration to the lifted configuration. The travel limit device 44 may limit pivoting displacement of a suspension arm 32, 34 pivotably connected to the hanger bracket 24.

The tag axle suspension system 18 can include a travel limit device 44 that limits compression of at least one air spring 40 of the suspension system in the lifted configuration of the hanger bracket 24. The travel limit device 44 may prevent substantial compression of the air spring 40 in the lifted configuration of the hanger bracket 24.

Also provided to the art by the above disclosure is a tag axle suspension system 18 for use with a vehicle 10, with the tag axle suspension system 18 comprising at least one hanger bracket 24 pivotable to deployed and lifted configurations, at least one air spring 40, and at least one travel limit device 44 that limits compression of the air spring 40 in the lifted configuration of the hanger bracket 24.

The tag axle suspension system 18 in this example can also include at least one tire 20, the tire being a lowest component of the suspension system 18 in the lifted configuration of the hanger bracket 24.

The air spring 40 may suspend an air spring support 42 above an axle 30 of the suspension system 18, and the travel limit device 44 may limit displacement of the axle 30 toward the air spring support 42 in the lifted configuration of the hanger bracket 24.

The travel limit device 44 can comprise a first structure 46 attached to an axle 30, and a second structure 48 that attaches to a frame 14 of the vehicle 10. The first structure 46 may pivot toward the second structure 48 in response to displacement of the hanger bracket 24 toward the lifted configuration. The travel limit device 44 can limit pivoting displacement of at least one suspension arm 32, 34 pivotably connected to the hanger bracket 24.

A tag axle suspension system 18 for connection to a vehicle frame 14 can, in one example, comprise at least one hanger bracket 24 pivotable between deployed and lifted configurations, an axle 30, at least one suspension arm 32, 34 pivotably connected between the hanger bracket 24 and the axle 30, and a travel limit device 44 that limits displacement of the suspension arm 32, 34 in the lifted configuration of the hanger bracket 24.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A tag axle suspension system, comprising:
    at least one tire;
    at least one hanger bracket pivotable relative to a vehicle frame to deployed and lifted configurations;
    at least one air spring which, in the deployed configuration, suspends an air spring support pivotably attached to the vehicle frame above an axle of the suspension system; and
    at least one travel limit device which, in the lifted configuration, limits displacement of the axle toward the air spring support,
    wherein, in the lifted configuration, the tire comprises a first component of the suspension system engageable with a road surface.

2. The tag axle suspension system of claim 1, wherein the travel limit device comprises a first structure attached to the axle, and a second structure that attaches to the vehicle frame.

3. The tag axle suspension system of claim 2, wherein the first structure pivots toward the second structure in response to displacement of the hanger bracket from the deployed configuration to the lifted configuration.

4. The tag axle suspension system of claim 1, wherein the travel limit device limits pivoting displacement of at least one suspension arm pivotably connected to the hanger bracket.

5. The tag axle suspension system of claim 1, wherein the at least one travel limit device limits compression of the at least one air spring of the suspension system in the lifted configuration of the hanger bracket.

6. The tag axle suspension system of claim 5, wherein the travel limit device prevents substantial compression of the air spring in the lifted configuration of the hanger bracket.

7. The tag axle suspension system of claim 1, wherein the tire comprises a lowest component of the suspension system in the lifted configuration of the hanger bracket.

8. A tag axle suspension system for use with a vehicle, the tag axle suspension system comprising:
    at least one hanger bracket pivotable to deployed and lifted configurations;
    at least one air spring; and
    at least one travel limit device that limits compression of the air spring in the lifted configuration of the hanger bracket.

9. The tag axle suspension system of claim 8, further comprising at least one tire, the tire being a first component of the suspension system engageable with a road surface in the lifted configuration of the hanger bracket.

10. The tag axle suspension system of claim 8, further comprising at least one tire, the tire being a lowest component of the suspension system in the lifted configuration of the hanger bracket.

11. The tag axle suspension system of claim 8, wherein the air spring suspends an air spring support above an axle of the suspension system, and wherein the travel limit device limits displacement of the axle toward the air spring support in the lifted configuration of the hanger bracket.

12. The tag axle suspension system of claim 8, wherein the travel limit device comprises a first structure attached to an axle, and a second structure that attaches to a frame of the vehicle.

13. The tag axle suspension system of claim 12, wherein the first structure pivots toward the second structure in response to displacement of the hanger bracket toward the lifted configuration.

14. The tag axle suspension system of claim 8, wherein the travel limit device limits pivoting displacement of at least one suspension arm pivotably connected to the hanger bracket.

15. The tag axle suspension system of claim 8, wherein the travel limit device prevents substantial compression of the air spring in the lifted configuration of the hanger bracket.

16. A tag axle suspension system for connection to a vehicle frame, the tag axle suspension system comprising:
    at least one hanger bracket pivotable between deployed and lifted configurations;
    an axle;
    at least one air spring which suspends an air spring support above the axle in the deployed configuration of the hanger bracket; and
    at least one travel limit device that limits displacement of the axle toward the air spring support in the lifted configuration of the hanger bracket.

17. The tag axle suspension system of claim 16, further comprising at least one tire, and wherein the tire is a first component of the suspension system engageable with a road surface in the lifted configuration of the hanger bracket.

18. The tag axle suspension system of claim 16, further comprising at least one tire, and wherein the tire comprises a lowest component of the suspension system in the lifted configuration of the hanger bracket.

19. The tag axle suspension system of claim 16, further comprising at least one suspension arm pivotably connected between the hanger bracket and the axle, and wherein the travel limit device limits displacement of the suspension arm in the lifted configuration of the hanger bracket.

20. The tag axle suspension system of claim 16, wherein the travel limit device comprises a first structure attached to the axle, and a second structure that attaches to the vehicle frame.

21. The tag axle suspension system of claim 20, wherein the first structure pivots toward the second structure in response to displacement of the hanger bracket toward the lifted configuration.

22. The tag axle suspension system of claim 16, wherein the travel limit device limits compression of the air spring in the lifted configuration of the hanger bracket.

23. The tag axle suspension system of claim 16, wherein the travel limit device prevents substantial compression of the air spring in the lifted configuration of the hanger bracket.

* * * * *